United States Patent
Ungar et al.

(10) Patent No.: US 7,036,112 B2
(45) Date of Patent: Apr. 25, 2006

(54) MULTI-MODE SPECIFICATION-DRIVEN DISASSEMBLER

(75) Inventors: David M. Ungar, Mountain View, CA (US); Mario I. Wolczko, San Carlos, CA (US); Bernd J. W. Mathiske, Cupertino, CA (US)

(73) Assignee: SUN Microsystems, Inc., Santa Clara, CA (US)

( * ) Notice: Subject to any disclaimer, the term of this patent is extended or adjusted under 35 U.S.C. 154(b) by 683 days.

(21) Appl. No.: 10/222,613

(22) Filed: Aug. 16, 2002

(65) Prior Publication Data

US 2004/0034851 A1   Feb. 19, 2004

(51) Int. Cl.
*G06F 9/44* (2006.01)
(52) U.S. Cl. .................... 717/136; 717/124; 712/4
(58) Field of Classification Search ............. 717/136, 717/146, 106, 124; 703/23; 712/4

See application file for complete search history.

(56) References Cited

U.S. PATENT DOCUMENTS

| 5,175,856 | A | * | 12/1992 | Van Dyke et al. ........... 717/151 |
| 6,061,513 | A | * | 5/2000 | Scandura .................... 717/142 |
| 6,748,584 | B1 | * | 6/2004 | Witchel et al. ............ 717/136 |
| 6,886,111 | B1 | * | 4/2005 | Tran .............................. 714/38 |
| 6,938,185 | B1 | * | 8/2005 | Bebout et al. ................ 714/28 |

OTHER PUBLICATIONS

"Code Size Minimization and Retargetable Assembly for Custom EPIC and VLIW Instruction Formats", Shail Aditya et al, ACM, Oct. 2000, pp. 752-773.*

"DERIVE: A Tool That Automatically Reverse-Engineers Instruction Encodings", Dawson R. Engler et al, ACM 2000, pp. 12-22.*

"Decompilation of Binary Programs", Cristina Cifuentes et al, Jahn Wiley & Sons, Ltd. Jan. 1995, pp. 811-829.*

"KAHLUA: A Hierarchial Circuit Disassembler", Bill Lin et al, ACM, 1987 pp. 311-317.*

"Set of Tools for Native Code Generation for the JAVA Virtual Machine", Oscar Azanon Esteire et al, ACM, Mar. 1998, pp. 73-79.*

"Generation of Software Tools from Processor Descriptions for Hardware/Software Codesign", Mark R. Hartoog et al, ACM 1997, 4 pages.*

(Continued)

*Primary Examiner*—Todd Ingberg
(74) *Attorney, Agent, or Firm*—Park, Vaughn & Fleming, LLP; Edward J. Grundler

(57) ABSTRACT

One embodiment of the present invention provides a system that facilitates implementing multi-mode specification-driven disassembler. During operation, the disassembler receives a machine-code version of a computer program. In order to disassemble a specific machine-code instruction from this machine-code version, the system compares the machine-code instruction against a set of instruction templates for assembly code instructions to identify a set of matching templates. Next, the system selects a matching template from the set of matching templates based on the state of a mode variable, which indicates a specificity mode for the disassembler. The system then disassembles the machine-code instruction using the operand fields defined by the matching template to produce a corresponding assembly code instruction.

21 Claims, 2 Drawing Sheets

OTHER PUBLICATIONS

"Assembly Language through the JAVA Virtual Machine", Carl Bredlau et al, ACM 2000, pp. 1994-2198.*

"Automatic Checking of Instruction Specifications", Mary Fernandez et al, ACM 1997, pp. 326-524.*

"GENOA- A Customizable, Front-End-Retargeting Source Code Analysis Framework", Premkumar T. Devanbu, ACM 1999, pp. 177-212.*

* cited by examiner

MULTI-MODE SPECIFICATION-DRIVEN DISASSEMBLER

BACKGROUND

1. Field of the Invention

The present invention relates to the design of disassemblers for converting machine code for a computer program into corresponding human-readable assembly code. More specifically, the present invention relates to a method and an apparatus for implementing a multi-mode specification-driven disassembler.

2. Related Art

During development of an application for a computer system, developers typically write source code for the application in a higher-level language (HLL). This source code version of the application is then translated by a compiler (or an assembler) into corresponding machine code version of the program that is suitable for execution on a specific target computer system.

To ensure correctness, developers often desire to examine the machine code created by the compiler (or assembler). Unfortunately, this machine code is comprised of a series of numbers that cannot easily be deciphered by even the most knowledgeable programmers. Hence, developers typically examine the machine code by first using a disassembler to translate the machine code into human-readable assembly code. This assembly code uses descriptive mnemonics to represent program instructions, and these mnemonics are more understandable to a human than the corresponding machine code numbers.

Some instruction set architectures, such as the instruction set architecture for the PowerPC, define instructions—such as branches and traps—that are so general that the general form verges on incomprehensibility. For example, an instruction that branches on equality might be written as, bc 12, 2,<destination>.

To simplify life for the programmer, the PowerPC assembler also defines a shorthand representation for the same instruction, so that the instruction can be more intuitively represented as beq<destination>.

While it is no problem for the assembler to generate the same bits for these two different mnemonics, the disassembler, which operates in the reverse direction, must choose one form or the other when it disassembles the bits for such an instruction.

Current disassemblers are designed to choose one source form, typically the most specific, such as the beq <destination> form. While this most-specific form is usually desired, the most general form is useful in specific situations, particularly for debugging compilers.

What is needed is a method and an apparatus that allows the user to control the assembly code form that the disassembler chooses while disassembling machine code.

SUMMARY

One embodiment of the present invention provides a system that facilitates implementing multi-mode specification-driven disassembler. During operation, the disassembler receives a machine-code version of a computer program. In order to disassemble a specific machine-code instruction from this machine-code version, the system compares the machine-code instruction against a set of instruction templates for assembly code instructions to identify a set of matching templates. Next, the system selects a matching template from the set of matching templates based on the state of a mode variable, which indicates a specificity mode for the disassembler. The system then disassembles the machine-code instruction using the operand fields defined by the matching template to produce a corresponding assembly code instruction.

In one embodiment of the present invention, a given template includes an opcode template, an opcode mask, and a specificity for the given template.

In one embodiment of the present invention, comparing the machine code instruction against a specific instruction template involves first performing a bitwise-AND operation between the machine code instruction and the opcode mask and then comparing the result with the opcode template. If the result of the bitwise-AND operation matches the opcode template, the system identifies the specific instruction template as a matching template.

In one embodiment of the present invention, the system reassembles the corresponding assembly code instruction into a machine-code instruction. If the resulting machine-code instruction is not a valid machine-code instruction, the system removes the corresponding instruction template from the set of matching templates.

In one embodiment of the present invention, the specificity for a given template indicates a number of bits that are set to one within the opcode mask of the given template.

In one embodiment of the present invention, the specificity mode specifies using either a most specific template or a least specific template.

In one embodiment of the present invention, the system allows a user to set the specificity mode for the disassembler through a graphical user interface.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

The data structures and code described in this detailed description are typically stored on a computer readable storage medium, which may be any device or medium that can store code and/or data for use by a computer system. This includes, but is not limited to, magnetic and optical storage devices such as disk drives, magnetic tape, CDs (compact discs) and DVDs (digital versatile discs or digital video discs), and computer instruction signals embodied in a transmission medium (with or without a carrier wave upon which the signals are modulated). For example, the transmission medium may include a communications network, such as the Internet.

Computer System

Figure 1:
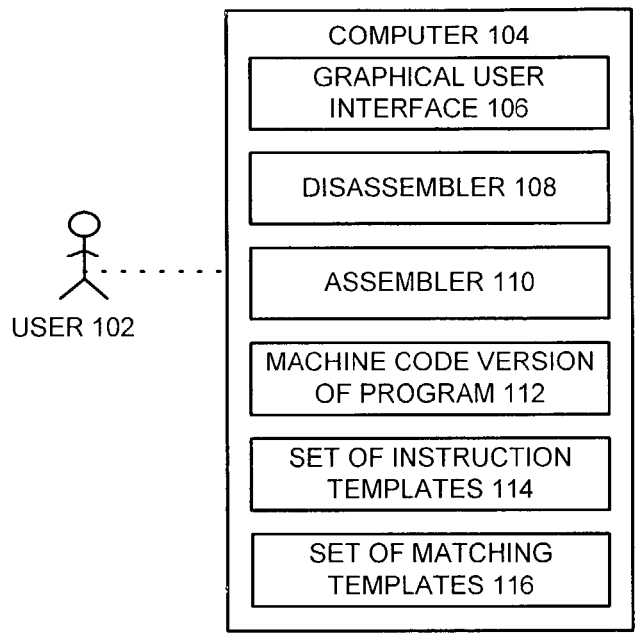
FIG. 1 illustrates a computer in accordance with an embodiment of the present invention.

FIG. 1 illustrates computer 104 in accordance with an embodiment of the present invention. Computer 104 includes graphical user interface 106, disassembler 108, assembler 110, machine code version of program 112, set of instruction templates 114, and set of matching templates 116. Computer 104 operates under control of user 102.

User 102 accesses graphical user interface 106 to control applications executing on computer 104 and receive the results of these applications. Specifically, user 102 uses graphical user interface 106 to control disassembler 108 and to receive results generated by disassembler 108 through graphical user interface 106.

Disassembler 108 is a multi-mode, specification-driven disassembler. User 102 can set the mode of disassembler 108 to use either the most specific or the least specific assembly code representation of a machine-code instruction as described below in conjunction with FIGS. 2, 3A, and 3B. Disassembler 108 uses templates from set of instruction templates 114 as specifications for controlling the disassembly of individual machine code instructions.

Disassembler 108 operates by taking a machine-code instruction from a machine code version of a program, for example, from machine code version of program 112, and finding matching instruction templates for the machine-code instruction from set of instruction templates 114. Templates from the set of instruction templates 114 are described in detail in conjunction with FIGS. 2, 3A, and 3B. Matching templates for the machine-code instruction are identified by first performing a bitwise-AND operation between the opcode mask within the template and the machine-code instruction. The result of this bitwise-AND operation is then compared with the opcode template within the template. If the result of the bitwise-AND and the opcode template match, the instruction is disassembled over each of its operand fields to form a corresponding assembly code instruction.

Next, assembler 110 receives the opcode and operand fields from disassembler 108 and reassembles the instruction. If a legal instruction is formed in which the opcode and operands do not violate any assembly rules, the matching template is added to set of matching templates 116. Computer 104 then selects either the most specific or least specific matching template from set of matching templates 116 depending on the specificity mode previously selected by user 102. The selected matching template determines how the corresponding assembly code instruction is formed.

Template

Figure 2:
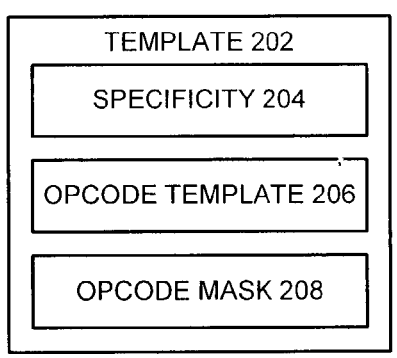
FIG. 2 illustrates a template in accordance with an embodiment of the present invention.

FIG. 2 illustrates template 202 in accordance with an embodiment of the present invention. Template 202 includes specificity 204, opcode template 206, and opcode mask 208. Opcode mask 208 is used to mask specific bits within a machine-code instruction as described above. Opcode template 206 provides a bit pattern to be compared against the results of the masking operation. If the masked machine-code instruction matches opcode template 208, the machine-code instruction is disassembled, reassembled, and possibly selected as a matching template as is described above. Specificity 204 is a count of the number of bits specified as one in opcode mask 208. In general, specificity 204 defines which templates within set of instruction templates 114 are the most specific and which templates are the least specific.

Specific Templates

Figure 3A:
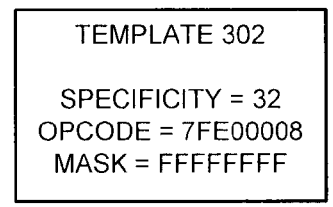
FIG. 3A illustrates a template with a high specificity in accordance with an embodiment of the present invention.

FIG. 3A illustrates a template with a high specificity in accordance with an embodiment of the present invention. Template 302 has a specificity of 32 because there are thirty-two one bits in its mask. The opcode template within template 302 is 7FE00008. This opcode template exactly corresponds to an unconditional trap instruction, thus only an unconditional trap instruction will be selected by template 302. Note that the unconditional trap instruction can be written as either "trap" or "tw 31, 0, 0" as desired by a programmer.

Figure 3B:
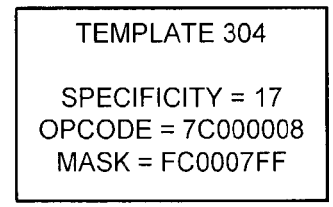
FIG. 3B illustrates a template with a low specificity in accordance with an embodiment of the present invention.

FIG. 3B illustrates a template with a low specificity in accordance with an embodiment of the present invention. Template 304 has a specificity of 17 because there are seventeen one bits in its mask. The opcode template within template 304 is 7C0007FF. This opcode template will match any trap instruction, either conditional or unconditional, including the unconditional trap instruction 7FE00008.

During operation, both template 302 and template 304 would be placed in the set of matching templates 116 for a machine-code instruction coded 7FE00008. The system generates different assembly code instructions for a given machine-code instruction based on the specificity mode for disassembler 108. User 102 is presented with trap if the mode is set to most-specific, while user 102 is presented with tw 31, 0, 0 if the mode is set to least-specific.

Disassembling an Instruction

Figure 4:
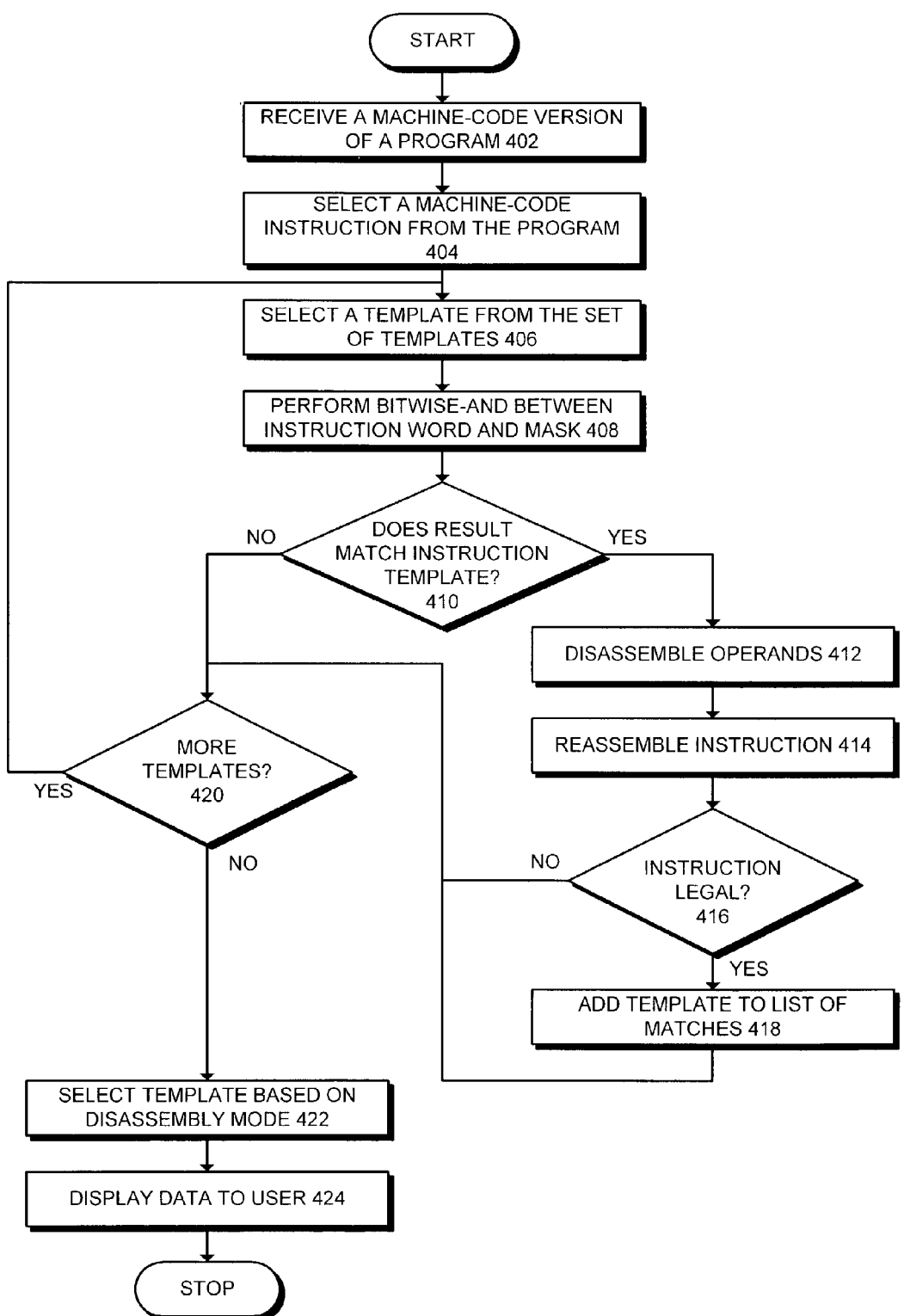
FIG. 4 presents a flowchart illustrating the process of disassembling a machine, code instruction in accordance with an embodiment of the present invention.

FIG. 4 is a flowchart illustrating the process of disassembling a machine-code instruction in accordance with an embodiment of the present invention. The process starts when the system receives a machine code program for disassembly (step 402). Next, the system selects a machine-code instruction from the program for disassembly (step 404).

The system then selects a template from the set of templates (step 406). Next, the system performs a bitwise-AND between the machine-code instruction and the mask within the template (step 408). After performing the bitwise-AND, the system compares the result with the opcode template within the template (step 410). If there is a match, the system disassembles the operands for the instruction (step 412). The system then reassembles the disassembled instruction (step 414). If the reassembled instruction is a legal instruction (step 416), the system adds the template to the set of matching templates 116 (step 418).

After adding the template to the set of matching templates 116, if the reassembled instruction is not legal at step 416, or if the result of the bitwise-AND does not match the template at step 410, the system determines if there are more templates to check (step 420). If so, the process returns to step 406 to continue processing templates. Otherwise, the system selects a template from the set of matching templates 116 based on the specificity mode of the disassembler (step 422). As described above, the most-specific or the least-specific template is chosen based on the specificity mode of the disassembler. Finally, the system displays the data to the user (step 424). Note that displaying the data to the user can involve storing the data in a file for later use by the user.

The foregoing descriptions of embodiments of the present invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method for implementing a disassembler, wherein the disassembler is a mode-settable, specification-driven disassembler, comprising:
receiving a machine-code version of a computer program;
comparing a machine-code instruction from the machine-code version of the computer program against a set of templates for assembly code instructions to identify a set of matching templates;
selecting a matching template from the set matching templates based on the state of a mode variable indicating a specificity mode for the disassembler, wherein the specificity mode variable indicates whether a more-specific or a less-specific assembly code representation of the machine-code instruction is to be selected; and
disassembling the machine-code instruction using the operand fields defined by the matching template to produce a corresponding assembly code instruction.

2. The method of claim 1, wherein a given template includes an opcode template, an opcode mask, and a specificity for the given template.

3. The method of claim 2, wherein comparing the machine-code instruction against a specific instruction template involves:
performing a bitwise-AND operation between the machine-code instruction and the opcode mask;
comparing a result of the bitwise-AND operation with the opcode template; and
if the result matches the opcode template, identifying the specific instruction template as a matching template.

4. The method of claim 3, further comprising:
reassembling the corresponding assembly code instruction into a machine-code instruction; and
if the resulting machine-code instruction is not a valid machine-code instruction, removing the corresponding instruction template from the set of matching instruction templates.

5. The method of claim 2, wherein the specificity indicates a number of bits that are set to one within the opcode mask of the given template.

6. The method of claim 5, wherein the specificity mode specifies using either a most specific template or a least specific template.

7. The method of claim 6, further comprising allowing a user to set the specificity mode for the disassembler through a graphical user interface.

8. A computer-readable storage medium storing instructions that when executed by a computer cause the computer to perform a method for implementing a disassembler, wherein the disassembler is a mode-settable, specification-driven disassembler, the method comprising:
receiving a machine-code version of a computer program;
comparing a machine-code instruction from the machine-code version of the computer program against a set of templates for assembly code instructions to identify a set of matching templates;
selecting a matching template from the set matching templates based on the state of a mode variable indicating a specificity mode for the disassembler, wherein the specificity mode variable indicates whether a more-specific or a less-specific assembly code representation of the machine-code instruction is to be selected; and
disassembling the machine-code instruction using the operand fields defined by the matching template to produce a corresponding assembly code instruction.

9. The computer-readable storage medium of claim 8, wherein a given template includes an opcode template, an opcode mask, and a specificity for the given template.

10. The computer-readable storage medium of claim 9, wherein comparing the machine-code instruction against a specific instruction template involves:
performing a bitwise-AND operation between the machine-code instruction and the opcode mask;
comparing a result of the bitwise-AND operation with the opcode template; and
if the result matches the opcode template, identifying the specific instruction template as a matching template.

11. The computer-readable storage medium of claim 10, the method further comprising:
reassembling the corresponding assembly code instruction into a machine-code instruction; and
if the resulting machine-code instruction is not a valid machine-code instruction, removing the corresponding instruction template from the set of matching instruction templates.

12. The computer-readable storage medium of claim 9, wherein the specificity indicates a number of bits that are set to one within the opcode mask of the given template.

13. The computer-readable storage medium of claim 12, wherein the specificity mode specifies using either a most specific template or a least specific template.

14. The computer-readable storage medium of claim 13, the method further comprising allowing a user to set the specificity mode for the disassembler through a graphical user interface.

15. An apparatus for implementing a disassembler, wherein the disassembler is a mode-settable, specification-driven disassembler, comprising:
a receiving mechanism that is configured to receive a machine-code version of a computer program;
a comparing mechanism that is configured to compare a machine-code instruction from the machine-code version of the computer program against a set of templates for assembly code instructions to identify a set of matching templates;
a selecting mechanism that is configured to select a matching template from the set matching templates based on the state of a mode variable indicating a specificity mode for the disassembler, wherein the specificity mode variable indicates whether a more-specific or a less-specific assembly code representation of the machine-code instruction is to be selected; and
a disassembling mechanism that is configured to disassemble the machine-code instruction using the operand fields defined by the matching template to produce a corresponding assembly code instruction.

16. The apparatus of claim 15, wherein a given template includes an opcode template, an opcode mask, and a specificity for the given template.

17. The apparatus of claim 16, further comprising:
a logic mechanism that is configured to perform a bitwise-AND operation between the machine-code instruction and the opcode mask;
wherein the comparing mechanism is further configured to compare a result of the bitwise-AND operation with the opcode template; and an identifying mechanism that is configured to identify the specific instruction template as a matching template if the result of the bitwise-AND matches the opcode template.

18. The apparatus of claim 17, further comprising:
a reassembling mechanism that is configured to reassemble the corresponding assembly code instruction into a machine-code instruction; and
a removing mechanism that is configured to remove the corresponding instruction template from the set of matching instruction templates if the resulting machine-code instruction is not a valid machine-code instruction.

19. The apparatus of claim 16, wherein the specificity indicates a number of bits that are set to one within the opcode mask of the given template.

20. The apparatus of claim 19, wherein the specificity mode specifies using either a most specific template or a least specific template.

21. The apparatus of claim 20, further comprising a mode selecting mechanism that is configured to allow a user to set the specificity mode for the disassembler through a graphical user interface.

\* \* \* \* \*